United States Patent [19]

Fay

[11] 3,881,288
[45] May 6, 1975

[54] ATTACHMENT ASSEMBLY
[75] Inventor: H. Peter Fay, Solana Beach, Calif.
[73] Assignee: General Atomic Company, San Diego, Calif.
[22] Filed: May 4, 1972
[21] Appl. No.: 250,363

[52] U.S. Cl. ............ 52/224; 52/249; 29/452; 29/527; 176/87; 52/268; 52/404; 52/408
[51] Int. Cl. ............................................. G21 13/00
[58] Field of Search ...... 52/224, 222, 223 R, 223 L, 52/248, 619, 268, 267, 378, 379, 406, 408, 621, 249, 562, 404, 361, 363, 741, 245–7; 29/452; 254/29 A; 24/90 B; 176/87

[56] References Cited
UNITED STATES PATENTS
1,771,822   7/1930   Soans ................................. 24/90 B
2,357,722   9/1944   Balduf ................................. 52/547
3,595,728   7/1971   Robson ............................... 52/247

FOREIGN PATENTS OR APPLICATIONS
2,009,124   1/1970   France .............................. 52/223 L Primary Examiner—Henry C. Sutherland
Assistant Examiner—Mark H. Wolk
Attorney, Agent, or Firm—Fitch, Even, Tabin & Luedeka

[57] ABSTRACT

The attachment of two structural members is described which includes a flexible cable extending between the structural members secured thereto at each end. A resilient compressible interlayer maintains the cable under tension.

2 Claims, 5 Drawing Figures

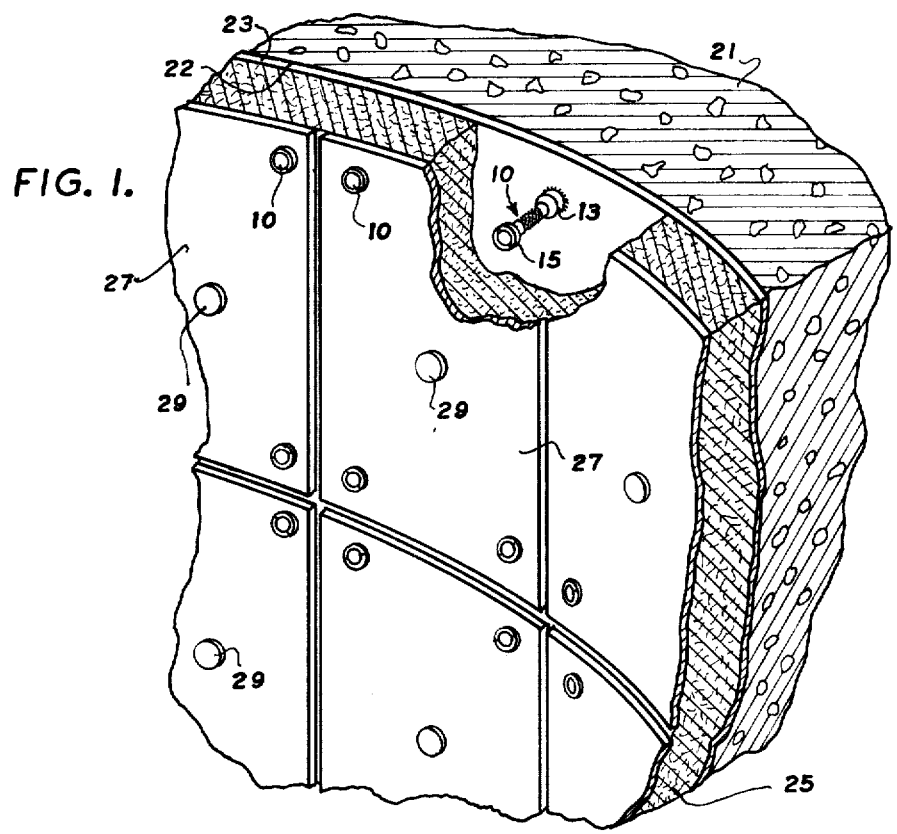
FIG. I.
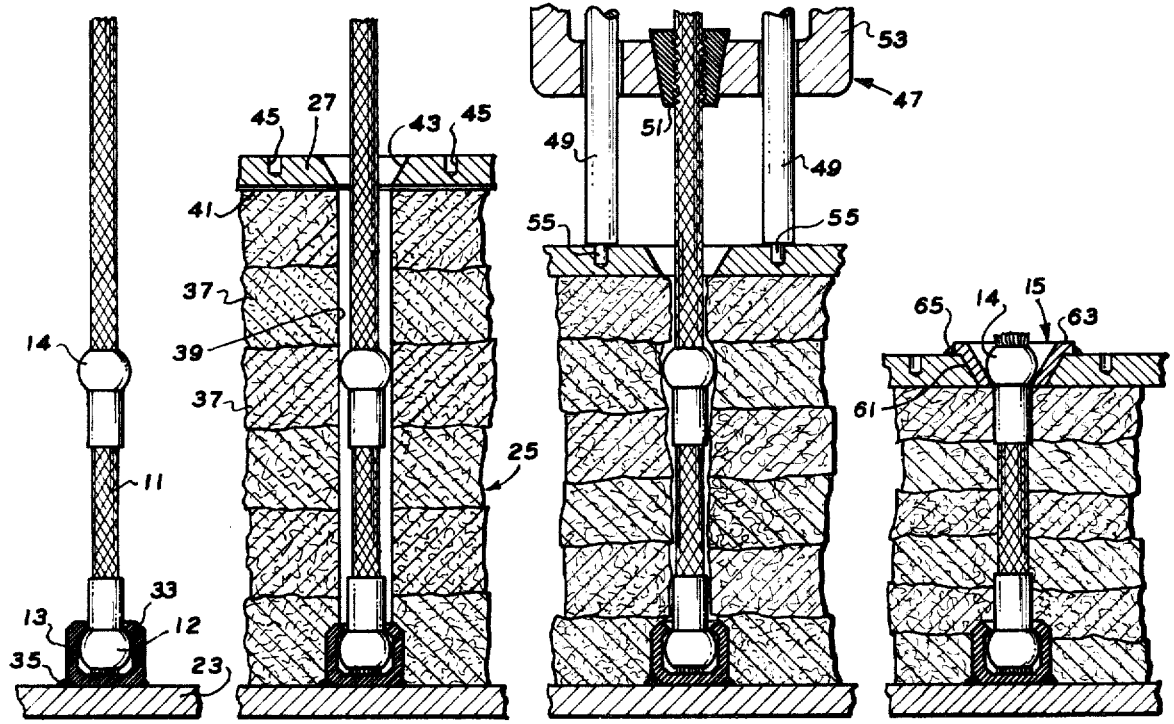
FIG. 2. FIG. 3. FIG. 4. FIG. 5.

ATTACHMENT ASSEMBLY

This invention relates generally to attachment assemblies and, more particularly, to an attachment assembly for retaining two structural members against a resilient compressible interlayer, such as in a double-wall assembly.

The invention is described specifically herein in the context of providing a double-walled thermal barrier inside a prestressed concrete reactor vessel for a nuclear reactor. The invention, however, has broader application than that specifically described herein. More particularly, the invention is applicable in any situation wherein tensile loads between two structural members must be absorbed, wherein relative motion between structural members under tensile load must be absorbed, or wherein maximum resistance to conductive heat transfer between structural members is required.

In many types of nuclear reactors wherein the reactor core, heat exchangers, or other elements are contained within a prestressed concrete reactor vessel, a thermal barrier is provided in the interior of the pressure vessel. Typically, this thermal barrier is comprised of a plurality of plates or panels which are secured to the metal liner for the pressure vessel spaced a distance therefrom, a fibrous thermal insulation interlayer in the space between the panels and the liner, and a plurality of attachment assemblies for retaining the panels against the fibrous material and attaching the panels to the liner.

In a nuclear reactor of this type, relative motion between the panels and the liner occurs due to thermal expansion and contraction of the panels and liner. Prior art attachment assemblies designed to accommodate this motion have often been extremely complicated to assemble and of a relatively high cost. Any areas in the attachment assemblies wherein sliding metal to metal contact is necessary are undesirable, since self-welding and galling of components in metal to metal contact is likely to occur. This can cause seizure of sliding components with the possibility of failure or severe damage to the attachment. On the other hand, rigid attachments must be made very strong to withstand high bending stresses, thereby resulting in increased heat transfer between the panels and the liner, reducing thermal efficiency.

It is an object of the present invention to provide an improved attachment assembly.

Another object of the invention is to provide an improved method of securing two structural members against a tensile load.

It is another object of the invention to provide an attachment assembly for a thermal barrier assembly which accommodates parallel relative motion between the structural members without sliding metal to metal contact.

A further object of the invention is to provide an attachment assembly for a double-wall assembly which minimizes heat transfer.

Another object of the invention is to provide an attachment assembly which is low in cost, simple of construction, and easy to install.

Other objects of the invention will become apparent to those skilled in the art from the following description, taken in connection with the accompanying drawings wherein:

FIG. 1 is a perspective view illustrating the general use of the attachment assembly of the invention; and FIGS. 2 through 5 illustrate how the attachment assembly of the invention is installed.

Very generally, the attachment assembly 10 of the invention comprises a flexible cable 11 with a first shank ball 12 secured at one end of the cable secured in a ball socket 13. The ball socket 13 is secured to one of the structural members to secure the one end of the cable to the one structural member. The second shank ball 14 is secured to the other end of the cable by a second ball socket 15 secured to the other structural member.

Referring now more particularly to FIG. 1, the device of the invention is illustrated in connection with a prestressed concrete nuclear reactor vessel. A portion of the concrete reactor vessel is illustrated at 21 and the vessel defines a cylindrical chamber 22. The chamber 22 may contain the reactor core, or heat exchangers, not shown, and is therefore preferably thermally insulated to provide low heat loss and prevent deterioration in the structural integrity of the concrete pressure vessel. The chamber 22 is provided with a steel wall or liner 23, suitably anchored to the concrete by means, not shown. On the inside of the steel liner is an interlayer of fibrous thermal insulation material 25 of any type suitable for such purpose, as will be known to those skilled in the art. The double-wall construction is completed by the inner wall comprised of a plurality of steel plates or panels 27 which are spaced slightly from each other and secured to the liner 23 to press against the insulation 25. A typical size for the panels 27 is 7 feet by 3 feet, although other sizes or configurations are possible depending upon the particular reactor design.

In the described nuclear reactor construction, the double-wall assembly lining the interior of the prestressed concrete reactor vessel is formed by compressing the thermal fibrous material 25 and installing the cover plates 27 by suitable attachment assemblies to the liner 23. As previously mentioned, in order to absorb the load imposed by the compressed fibrous insulation while flexing to allow thermally induced dimensional variations in the attachment assembly, cover plates 27 and liner 23, the attachment assemblies must be appropriately designed. In a typical reactor design, as many as 1000 of the plates 27 may be utilized, each requiring a plurality of attachment assemblies. Typical operating temperatures encountered exceed 700°F. As previously mentioned, prior art devices of this nature tend to be complicated, of high cost, difficult to install, and high in heat transfer.

In utilizing the attachment assembly of the invention, the thermal barrier illustrated in FIG. 1 is formed by utilizing a rigid attachment stud 29 of any suitable design welded to the liner 23 and extending to and welded to the center of each of the panels 27. On each panel, typically four of the attachment assemblies 10 of the invention are provided, positioned toward the four corners of each panel. During reactor operation, growth of the plate 27 between the rigid center stud 29 and the periphery of the plate is accommodated by the attachment assemblies of the invention, while at the same time the load imposed by the compressed fibrous insulation is absorbed. It should be noted, however, that the use of a rigid center stud 29 is not imperative, since the attachment assemblies alone may be adequate to properly locate and support the panels.

In assembling the wall assembly illustrated in FIG. 1, the attachment assemblies, illustrated at 10, are first secured to the liner 23. The thermal barrier 25 is then put in place, and then the plates 27 are attached to the attachment assemblies 10. In carrying out this operation, the method of securing the plate 27 to the liner 23 against the thermal barrier 25 will be described in connection with a single attachment assembly 10. It is to be understood, however, that the other attachment assemblies are similarly secured at the same time.

Referring now more particularly to FIGS. 2–5, the method of securing the plates 27 to the liner 23 is described in greater detail. The shank balls 12 and 14 have diametrical openings (not shown) therein and have hollow cylindrical extensions aligned with the openings. Prior to installation, the shank balls 12 and 14 are placed on the cable 11 with the cable passing through the openings in the shank balls and the extensions. The shank ball is then swaged to the cable. The shank ball 12 is then inserted in the socket 13, and the socket is swaged in the region 33 about the shank ball 12. The socket 13 is then welded, as indicated in the region 35, to the liner 23. It should be noted that an excess amount of cable is provided which protrudes through the shank ball 14. This excess cable is used during installation, as described below, to permit compression of the fibrous insulation 25 and is removed upon completion of the installation. Also, the excess cable is used in a pull test to test the weld 35.

The next step in the installation procedure is illustrated in FIG. 3. The fibrous thermal barrier 25 is placed over the attachment. The fibrous thermal barrier 25 is formed from a plurality of blankets 37, typically 1 inch thick. Holes 39 are punched in the blankets to permit placement of the blankets over the attachment assemblies.

After placement of the blankets 37, the plate 27 is placed in position as shown in FIG. 3. Prior to placement of the plates 27, a thin seal sheet 41, typically 1/16 inch thick, is placed between the insulation 37 and the cover plate 27. The purpose of the seal sheet 41 is to retain the insulation in the gaps between the cover plates 27. The cover plate 27 is provided with a frustoconical opening or hole 43 therein and is also provided with three locating holes 45 distributed at 120° intervals about the opening 43. The cable 11 passes through the opening 43.

In FIG. 4, the next step in the installation procedure is illustrated. A cable tensioning tool 47, of suitable design, is used. The cable tensioning tool has three guide posts 49 extending therefrom at 120° intervals about a cable gripping attachment 51 located in the center of the body 53 of the cable tensioning tool 47. The lower ends of the guide posts are provided with locating studs 55 which enter the locating holes 45 in the plate 27 to locate the cable tensioning tool. In locating the cable tensioning tool, the cable 11 is drawn up through the cable gripper 51, and a suitable mechanism, not illustrated, is operated to move the guide posts 49 through the body 53 of the cable tensioning tool in the manner of a jack. By moving the guide posts 49 in a direction away from the plate 23, the fibrous thermal insulation 25 is compressed (shown partially compressed in FIG. 4) until finally the shank ball 14 passes through the opening 43 to the other side of the plate 27.

Once the shank ball 14 has passed through the opening 43, the second ball socket 15 is secured to the plate 27. The second ball socket in the illustrated embodiment of the invention (FIG. 5) is a split locking ferrule 15. The two halves of the ferrule 15 are placed in position about the shank ball 14. The outer surface of the ferrule 15 is frustoconical at 61 and mates against the frustoconical surface of the hole 43. The ferrule 15 also includes an annular flange 63 which seats against the surface of the plate 27 opposite the liner 23. The interior of the ferrule is of a configuration to mate with and capture the shank ball 14 in a ball socket.

Once the split locking ferrule 15 is in place, the cable tensioning tool 47 is removed, releasing the tension and locking the ferrule 15 in the hole 43. The excess cable 11 is then removed by cutting it off, and the ferrule is permanently attached to the plate 27 by a weld indicated at 65 in FIG. 5.

The described attachment assembly accommodates relative motion of the plates 27 and the liner 23 under tensile load by flexure of the cable 11 without inducing significant moment loads. There are no sliding metal to metal contacts in the parts nor are high bending stress levels present. The number of parts required per attachment assembly is extremely low, effecting a considerable cost saving. Installation is relatively simple, since the cable, because of its flexure and freedom of rotation, can accommodate considerable misalignment of mating parts. This substantially eases the tolerance requirements of the cover plate assembly.

Another significant advantage in the invention is in the minimization of heat transfer between the attached structural elements 23 and 27. This is particularly important in nuclear reactors to minimize heat loss from the interior of the reactor vessel. This is because, since the device is operated under tension loading only, no structure is required to take out bending moment loads. This enables a significant reduction in cross sectional area in comparison with attachments designed to accommodate bending moment loads as well.

It may therefore be seen that the invention provides an attachment assembly, a wall assembly, and a method of securing two structural members against tensile load, wherein relative displacement of structural members is readily accommodated without inducing high moment loads on the structure. Other advantages include ease of installation, low cost and simplicity of construction, and minimization of size for low heat transfer.

Various modifications of the invention in addition to those shown and described herein will become apparent to those skilled in the art from the foregoing description and accompanying drawings. Such modifications are intended to fall within the scope of the appended claims.

What is claimed is:

1. In a pressure vessel, a wall assembly comprising, a fixed rigid metal liner for the pressure vessel, a plurality of rigid metal panels spaced from said liner to form an insulating space, a resilient compressible fibrous thermal insulation material filling said insulation space between said panels and said liner, said panels being displaceable toward said liner to compress said insulation, and a plurality of attachment assemblies securing said panels to said liner with said fibrous thermal insulation under compression, each of said attachment assemblies comprising a flexible cable, first and second shank balls secured toward opposite ends of said cable, a first ball socket secured to said liner, said first shank ball being received and secured in said ball socket to secure one end of said cable to said liner, each of said attachment assemblies also having a second ball socket secured to one of said panels and secured about said second shank ball, said cable being under tension provided by said compressed insulation.

2. A wall assembly according to claim 1 wherein said second ball socket comprises an opening in said panel, and a split locking ferrule secured about said second shank ball in the opening in said panel.

* * * * *

UNITED STATES PATENT OFFICE
CERTIFICATE OF CORRECTION

PATENT NO. : 3,881,288
DATED : May 6, 1975
INVENTOR(S) : H. Peter Fay

It is certified that error appears in the above--identified patent and that said Letters Patent are hereby corrected as shown below:

Column 3, line 63  Delete "away from" and insert --toward--

Signed and Sealed this twenty-second Day of July 1975

[SEAL]

Attest:

RUTH C. MASON
Attesting Officer

C. MARSHALL DANN
Commissioner of Patents and Trademarks